United States Patent
Zhang et al.

(10) Patent No.: US 10,674,506 B2
(45) Date of Patent: Jun. 2, 2020

(54) RESOURCE DETERMINING METHOD, RELATED DEVICE, AND SYSTEM

(71) Applicant: Huawei Technologies Co., Ltd., Shenzhen, Guangdong (CN)

(72) Inventors: Chi Zhang, Shanghai (CN); Xiaojun Ma, Shanghai (CN); Junchao Li, Shanghai (CN); Zhengwei Gong, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 15 days.

(21) Appl. No.: 16/186,219

(22) Filed: Nov. 9, 2018

(65) Prior Publication Data

US 2019/0081769 A1     Mar. 14, 2019

Related U.S. Application Data

(63) Continuation of application No. PCT/CN2017/084175, filed on May 12, 2017.

(30) Foreign Application Priority Data

May 13, 2016   (CN) .......................... 2016 1 0319016

(51) Int. Cl.
*H04W 72/04*   (2009.01)
*H04L 5/14*   (2006.01)
*H04L 12/24*   (2006.01)

(52) U.S. Cl.
CPC .......... *H04W 72/0446* (2013.01); *H04L 5/14* (2013.01); *H04L 41/08* (2013.01); *H04W 72/04* (2013.01); *H04W 72/0406* (2013.01)

(58) Field of Classification Search
CPC ............. H04W 72/0446; H04W 72/04; H04W 72/0406; H04W 72/0413; H04W 72/042; H04L 5/14; H04L 41/08
See application file for complete search history.

(56) References Cited

U.S. PATENT DOCUMENTS

| | | | |
|---|---|---|---|
| 2014/0010127 A1 | 1/2014 | Cheng et al. | |
| 2014/0112261 A1 | 4/2014 | Chen et al. | |
| 2014/0293844 A1* | 10/2014 | Meng | H04L 5/1438 370/280 |
| 2014/0334353 A1* | 11/2014 | Wei | H04W 72/1263 370/280 |
| 2015/0050938 A1* | 2/2015 | Uemura | H04W 72/0413 455/452.1 |

(Continued)

FOREIGN PATENT DOCUMENTS

| CN | 102651662 A | 8/2012 |
|---|---|---|
| CN | 103916957 A | 7/2014 |

(Continued)

OTHER PUBLICATIONS

Intel Corporation,"Frame structure for new radio interface",3GPP TSG RAN WG1 Meeting #84bis R1-162726,Busan, Korea Apr. 11-15, 2016,total 5 pages.

(Continued)

*Primary Examiner* — Tejis Daya
(74) *Attorney, Agent, or Firm* — Womble Bond Dickinson (US) LLP

(57) ABSTRACT

A resource determining method is provided. The method includes: determining a time domain position and a resource unit type of a first time domain resource unit based on first configuration information; determining a time domain position of a second time domain resource unit based on the time domain position of the first time domain resource unit, where the time domain position of the second time domain resource unit is at a time domain position which is different from the time domain position of the first time domain resource unit and is within a preset time period; and receiving second configuration information from a network-side device, and determining a resource unit type of the second time domain resource unit based on the second configuration information. Thus, subframe types of various subframes in D-TDD can be determined.

20 Claims, 6 Drawing Sheets

(56) References Cited

U.S. PATENT DOCUMENTS

| | | | |
|---|---|---|---|
| 2015/0085723 A1* | 3/2015 | Chen | H04W 72/042 370/280 |
| 2015/0110011 A1* | 4/2015 | Wei | H04W 74/006 370/329 |
| 2015/0249987 A1 | 9/2015 | Yin et al. | |
| 2015/0327324 A1* | 11/2015 | Wei | H04W 52/0235 370/280 |
| 2016/0013902 A1* | 1/2016 | Cui | H04W 72/04 370/329 |
| 2016/0269226 A1* | 9/2016 | Zeng | H04W 72/0446 |
| 2017/0111888 A1* | 4/2017 | Dinan | H04W 72/042 |
| 2017/0126300 A1* | 5/2017 | Park | H04L 5/005 |
| 2018/0220323 A1* | 8/2018 | Chen | H04L 5/0091 |
| 2019/0075561 A1* | 3/2019 | Tang | H04L 5/0053 |

FOREIGN PATENT DOCUMENTS

| | | |
|---|---|---|
| CN | 104080187 A | 10/2014 |
| CN | 104159305 A | 11/2014 |
| CN | 104284348 A | 1/2015 |
| EP | 3416442 A1 | 12/2018 |
| JP | 2016503246 A | 2/2016 |
| WO | 2015072769 A1 | 5/2015 |
| WO | 2017177451 A1 | 10/2017 |

OTHER PUBLICATIONS

Lenovo,"Frame structure design for next radio interface",3GPP TSG RAN WG1 Meeting #84bis R1-162742,Busan, Korea, Apr. 11-15, 2016,total 3 pages.

Ericsson,"On subframes",TSG-RAN WG1 #84bis R1-163622,Busan, South Korea, Apr. 11-15, 2016,total 1 page.

NTT Docomo, Inc.,"Initial views on frame structure for NR access technology",3GPP TSG RAN WG1 Meeting #84bis R1-163112,Busan, Korea Apr. 11-15, 2016,total 7 pages.

Sharp,"Fallback operation and reliability improvement of explicit L1 signalling for DL-UL reconfiguration",3GPP TSG RAN WG1 Meeting #74 R1-133228,Barcelona, Spain, Aug. 19-23, 2013,total 7 pages.

* cited by examiner

| | | | | | | | | | | |
|---|---|---|---|---|---|---|---|---|---|---|
| Config.0 | | D | S | U | U | U | D | S | U | U | U |
| Config.1 | | D | S | U | U | D | D | S | U | U | D |
| Config.2 | | D | S | U | D | D | D | S | U | D | D |
| Config.3 | | D | S | U | U | U | D | D | D | D | D |
| Config.4 | | D | S | U | U | D | D | D | D | D | D |
| Config.5 | | D | S | U | D | D | D | D | D | D | D |
| Config.6 | | D | S | U | U | U | D | S | U | U | D |

←――――――――――― 1 frame ―――――――――――→

RESOURCE DETERMINING METHOD, RELATED DEVICE, AND SYSTEM

CROSS-REFERENCE TO RELATED APPLICATIONS

This application is a continuation of International Application No. PCT/CN2017/084175, filed on May 12, 2017, which claims priority to Chinese Patent Application No. 201610319016.8, filed on May 13, 2016, The disclosures of the aforementioned applications are herein incorporated by reference in their entireties.

TECHNICAL FIELD

The present disclosure relates to the field of computer technologies, and in particular, to a resource determining method, a related device, and a system.

BACKGROUND

In an existing Long Term Evolution (LTE) time division duplex (TDD) system, seven different uplink (UL)/downlink (DL) subframe configurations are defined. "U", "D", and "S" in FIG. 1 are used to indicate subframe types. "U" indicates an uplink subframe, "D" indicates a downlink subframe, and "S" indicates a special subframe. In each configuration, 10 consecutive subframes form one radio frame. After obtaining a configuration type of a radio frame, user equipment (UE) can determine subframe types of various subframes.

With development of wireless network technologies, new services are emerging one after another, and different services have different resource requirements. This requires more efficient use of limited resources in future wireless networks. To achieve this objective, a dynamic time division duplex (D-TDD) technology gains increasing attention. The so-called D-TDD allows a network side to adjust an uplink/downlink subframe configuration more flexibly. An advantage is that the network side may dynamically adjust the uplink/downlink subframe configuration with a more refined granularity based on uplink/downlink resource requirements of different services, thereby achieving an objective of resource utilization optimization. Currently, the 3$^{rd}$ Generation Partnership Project (3GPP) has been formulating standards for a new radio access technology (NR) (also referred to as a fifth-generation mobile communications technology (5G)), and defines an importance of the D-TDD in the NR.

In discussions about the NR and the D-TDD, many companies have directly or indirectly expressed their opinions in supporting anchor subframes (or referred to as fixed subframes or non-dynamic subframes). An anchor subframe is a subframe in the D-TDD that is anchored and that does not allow a dynamic uplink/downlink change, and is used to transmit a necessary or important message in a system. For example, a DL anchor subframe (or a DL portion of an anchor subframe) may be used to transmit UE-common data, such as a synchronization signal, a system message, and a measurement reference signal, and a UL anchor subframe (or a UL portion of an anchor subframe) may be used to transmit information such as a physical random access channel (PRACH). FIG. 2 shows dynamic subframes and anchor subframes.

In discussions about the NR standards, it is already determined that a time-frequency resource that can be flexibly used shall be maximized as much as possible. From a D-TDD perspective, the time-frequency resource that can be flexibly used may be understood as a dynamic subframe different from the anchor subframe described above. An uplink/downlink attribute of the dynamic subframe is not anchored, and is configured dynamically by the network side depending on a requirement instead. This can greatly improve D-TDD flexibility and make an uplink/downlink attribute of the D-TDD meet various different service requirements in a more flexible and timely manner.

In a D-TDD scenario of the NR, subframe types of various subframes in the D-TDD cannot be properly determined based on the foregoing radio frame configurations.

SUMMARY

Embodiments of the present disclosure disclose a resource determining method, a related device, and a system, so that a time domain position and a resource unit type of a time domain resource unit can be determined.

According to a first aspect, a resource determining method is provided. The method includes:

determining a time domain position and a resource unit type of a first time domain resource unit based on first configuration information, where the first configuration information includes information used to indicate the time domain position and the resource unit type of the first time domain resource unit;

determining a time domain position of a second time domain resource unit based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; and receiving second configuration information from a network-side device, and determining a resource unit type of the second time domain resource unit based on the second configuration information, where the second configuration information includes information used to indicate the resource unit type of the second time domain resource unit.

By performing the foregoing steps, a terminal determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

In one embodiment, after the determining a time domain position and a resource unit type of a first time domain resource unit based on first configuration information, the method further includes:

receiving third configuration information from the network-side device, and determining a time domain position and a resource unit type of a third time domain resource unit based on the third configuration information, where the third configuration information includes information used to indicate the time domain position and the resource unit type of the third time domain resource unit; and the determining a time domain position of a second time domain resource unit based on the time domain position of the first time domain resource unit includes:

determining the time domain position of the second time domain resource unit based on the time domain position of the first time domain resource unit and the time domain position of the third time domain resource unit, where the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

In another embodiment, the receiving third configuration information from the network-side device includes:

receiving the third configuration information from the network-side device on the first time domain resource unit.

In yet another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In still another embodiment, the determining a time domain position and a resource unit type of a first time domain resource unit based on first configuration information includes:

determining a time domain position and a resource unit type of each of a plurality of first time domain resource units based on the first configuration information.

In another embodiment, the determining a time domain position of a second time domain resource unit based on the time domain position of the first time domain resource unit includes:

determining a time domain position of each of a plurality of second time domain resource units based on the time domain position of the first time domain resource unit.

In yet another embodiment, before the receiving second configuration information from a network-side device, the method further includes:

receiving fourth configuration information from the network-side device, where the fourth configuration information indicates control channels corresponding to a part of the plurality of second time domain resource units; and the receiving second configuration information from a network-side device includes:

receiving the second configuration information on the control channels corresponding to the part of the plurality of second time domain resource units, where the second configuration information is used to indicate resource unit types of the part of the plurality of second time domain resource units.

According to a second aspect, a resource determining method is provided. The method includes:

sending second configuration information to a terminal, where the terminal is configured to perform operations of determining a time domain position and a resource unit type of a first time domain resource unit based on first configuration information, determining a time domain position of a second time domain resource unit based on the time domain position of the first time domain resource unit, and determining a resource unit type of the second time domain resource unit based on the second configuration information; both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; the first configuration information includes information used to indicate the time domain position and the resource unit type of the first time domain resource unit; and the second configuration information includes information used to indicate the resource unit type of the second time domain resource unit.

By performing the foregoing steps, the terminal determines the time domain position and the resource unit type of the first time domain resource unit based on the pre-stored first configuration information, and further determines the time domain position and the resource unit type of the second time domain resource unit based on the second configuration information sent by a network-side device, without depending on a TDD configuration to determine a time domain position and a resource unit type of a resource unit.

In one embodiment, before the sending second configuration information to a terminal, the method further includes:

sending third configuration information to the terminal, where the terminal is configured to determine a time domain position and a resource unit type of a third time domain resource unit based on the third configuration information, and the third configuration information includes information used to indicate the time domain position and the resource unit type of the third time domain resource unit; the time domain position of the first time domain resource unit, the time domain position of the second time domain resource unit, and the time domain position of the third time domain resource unit are all within the preset time period; and the time domain position of the second time domain resource unit is at a time domain position which is different from the time domain position of the first time domain resource unit and the time domain position of the third time domain resource unit and is within the preset time period.

In another embodiment, the sending third configuration information to the terminal includes:

sending the third configuration information to the terminal on the first time domain resource unit.

In yet another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In still another embodiment, before the sending second configuration information to a terminal, the method further includes:

sending fourth configuration information to the terminal, where the fourth configuration information is used to instruct the terminal to receive the second configuration information on a control channel corresponding to the second time domain resource unit.

According to a third aspect, a terminal is provided, where the terminal includes a processor, a memory, and a transceiver, and the processor is configured to invoke a program in the memory to perform the following operations:

determining a time domain position and a resource unit type of a first time domain resource unit based on first configuration information, where the first configuration information includes information used to indicate the time domain position and the resource unit type of the first time domain resource unit;

determining a time domain position of a second time domain resource unit based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; and receiving, by using the transceiver, second configuration information from a network-side device, and determining a resource unit type of the second time domain resource unit based on the second configuration information, where the second configuration information includes information used to indicate the resource unit type of the second time domain resource unit.

By performing the foregoing operations, the terminal determines the time domain position and the resource unit type of the first time domain resource unit based on the first configuration information, and further determines the time domain position and the resource unit type of the second time domain resource unit based on the second configuration information sent by the network-side device, without depending on a TDD configuration to determine a time domain position and a resource unit type of a resource unit.

In one embodiment, after determining the time domain position and the resource unit type of the first time domain resource unit based on the first configuration information, the processor is further configured to:

receive, by using the transceiver, third configuration information from the network-side device, and determine a time domain position and a resource unit type of a third time domain resource unit based on the third configuration information, where the third configuration information includes information used to indicate the time domain position and the resource unit type of the third time domain resource unit; and that the processor determines a time domain position of a second time domain resource unit based on the time domain position of the first time domain resource unit by:

determining the time domain position of the second time domain resource unit based on the time domain position of the first time domain resource unit and the time domain position of the third time domain resource unit, where the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

In one embodiment, the processor receives, by using the transceiver, third configuration information from the network-side device by:

receiving, by using the transceiver, the third configuration information from the network-side device on the first time domain resource unit.

In another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In yet another embodiment, the processor determines a time domain position and a resource unit type of a first time domain resource unit based on first configuration information by:

determining a time domain position and a resource unit type of each of a plurality of first time domain resource units based on the first configuration information.

In still another embodiment, the processor determines a time domain position of a second time domain resource unit based on the time domain position of the first time domain resource unit by:

determining a time domain position of each of a plurality of second time domain resource units based on the time domain position of the first time domain resource unit.

In another embodiment, before receiving, by using the transceiver, the second configuration information from the network-side device, the processor is further configured to:

receive, by using the transceiver, fourth configuration information from the network-side device, where the fourth configuration information indicates control channels corresponding to a part of the plurality of second time domain resource units; and that the processor receives, by using the transceiver, second configuration information from a network-side device by:

receiving, by using the transceiver, the second configuration information on the control channels corresponding to the part of the plurality of second time domain resource units, where the second configuration information is used to indicate resource unit types of the part of the plurality of second time domain resource units.

According to a fourth aspect, a network-side device is provided, where the network-side device includes a processor, a memory, and a transceiver, and the processor is configured to invoke a program in the memory to perform the following operations:

sending second configuration information to a terminal by using the transceiver, where the terminal is configured to perform operations of determining a time domain position and a resource unit type of a first time domain resource unit based on first configuration information, determining a time domain position of a second time domain resource unit based on the time domain position of the first time domain resource unit, and determining a resource unit type of the second time domain resource unit based on the second configuration information; both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; the first configuration information includes information used to indicate the time domain position and the resource unit type of the first time domain resource unit; and the second configuration information includes information used to indicate the resource unit type of the second time domain resource unit.

By performing the foregoing operations, the terminal determines the time domain position and the resource unit type of the first time domain resource unit based on the first configuration information, and further determines the time domain position and the resource unit type of the second time domain resource unit based on the second configuration information sent by the network-side device, without depending on a TDD configuration to determine a time domain position and a resource unit type of a resource unit.

In one embodiment, before sending the second configuration information to the terminal by using the transceiver, the processor is further configured to:

send third configuration information to the terminal by using the transceiver, where the terminal is configured to determine a time domain position and a resource unit type of a third time domain resource unit based on the third configuration information, and the third configuration information includes information used to indicate the time domain position and the resource unit type of the third time domain resource unit; the time domain position of the first time domain resource unit, the time domain position of the second time domain resource unit, and the time domain position of the third time domain resource unit are all within the preset time period; and the time domain position of the second time domain resource unit is at a time domain position which is different from the time domain position of the first time domain resource unit and the time domain position of the third time domain resource unit and is within the preset time period.

In another embodiment, the processor sends third configuration information to the terminal by using the transceiver by:

sending the third configuration information to the terminal on the first time domain resource unit by using the transceiver.

In yet another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In still another embodiment, before sending the second configuration information to the terminal by using the transceiver, the processor is further configured to:

send fourth configuration information to the terminal by using the transceiver, where the fourth configuration information is used to instruct the terminal to receive the second configuration information on a control channel corresponding to the second time domain resource unit.

In one embodiment, the first configuration information includes type indication information used to indicate the resource unit type of the first time domain resource unit, and each resource unit type is corresponding to type indication information of the resource unit type.

In one embodiment, the second configuration information includes type indication information used to indicate the resource unit type of the second time domain resource unit, and each resource unit type is corresponding to type indication information of the resource unit type.

In one embodiment, when the third configuration information exists, the third configuration information includes the type indication information used to indicate the resource unit type of the third time domain resource unit, and each resource unit type is corresponding to type indication information of the resource unit type.

According to a fifth aspect, a terminal is provided, where the terminal includes functional units configured to perform some or all steps in any implementation of the first aspect.

According to a sixth aspect, a network-side device is provided, where the network-side device includes functional units configured to perform some or all steps in any implementation of the second aspect.

According to a seventh aspect, a communications system is provided. The communications system includes a network-side device and a terminal, where the terminal is configured to determine a time domain position and a resource unit type of a first time domain resource unit based on first configuration information, where the first configuration information includes information used to indicate the time domain position and the resource unit type of the first time domain resource unit;

the terminal is further configured to determine a time domain position of a second time domain resource unit based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period;

the network-side device is configured to send second configuration information to the terminal; and the terminal is further configured to receive the second configuration information from the network-side device, and determine a resource unit type of the second time domain resource unit based on the second configuration information, where the second configuration information includes information used to indicate the resource unit type of the second time domain resource unit.

In one embodiment, the terminal is the terminal in any implementation of the third aspect or the terminal described in the fifth aspect, and the network-side device is the network-side device in any implementation of the fourth aspect or the network-side device described in the sixth aspect.

According to an eighth aspect, a readable storage medium is provided, where the readable storage medium includes an instruction, and when the instruction is executed, the method described in the first aspect, any possible implementation of the first aspect, the second aspect, or any implementation of the second aspect is implemented.

By implementing the embodiments of the present disclosure, the terminal determines the time domain position and the resource unit type of the first time domain resource unit based on the first configuration information, and further determines the time domain position and the resource unit type of the second time domain resource unit based on the second configuration information sent by the network-side device, without depending on a TDD configuration to determine a time domain position and a resource unit type of a resource unit.

BRIEF DESCRIPTION OF DRAWINGS

The following briefly describes the accompanying drawings required for the background or embodiments.

DESCRIPTION OF EMBODIMENTS

The following describes the technical solutions in the embodiments of the present disclosure with reference to the accompanying drawings in the embodiments of the present disclosure.

A terminal described may be a mobile phone, a tablet computer, a notebook computer, a palmtop computer, a mobile Internet device (MID), a wearable device (for example, a smartwatch (such as iWatch), a smart band, or a pedometer), or another terminal device that may communicate with a network-side device. The network-side device described in the embodiments of the present invention may be an evolved NodeB (eNB) in LTE, a transmission/reception point (TRP) in NR, or another device that can schedule the foregoing terminal.

Figures 1, 2:
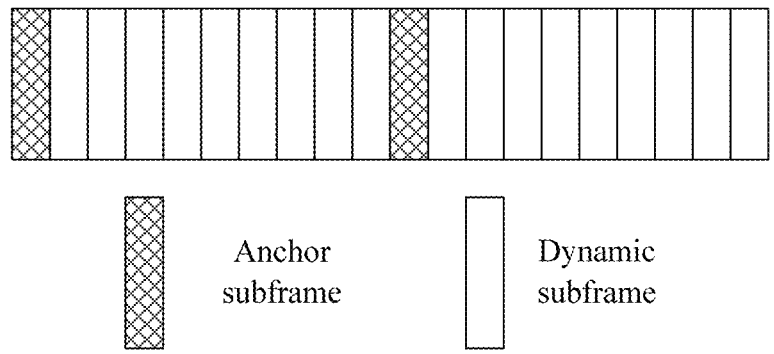
FIG. 1 is a schematic diagram of a scenario of subframe configurations in a radio frame in the prior art.
FIG. 2 is a schematic diagram of a scenario of dynamic subframes and anchor subframes in the prior art.
Figure 3:
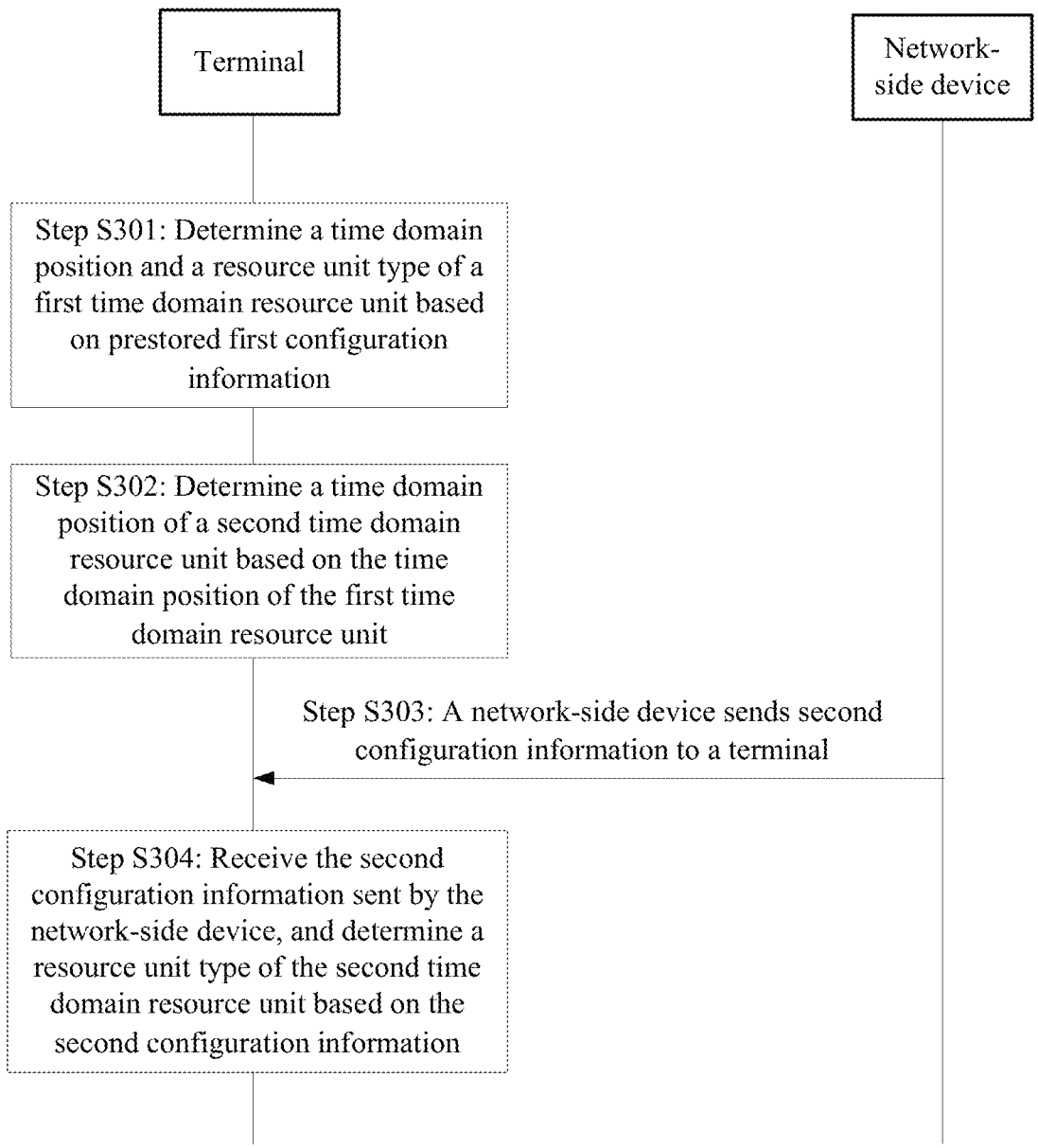
FIG. 3 is a schematic flowchart of a resource determining method according to an embodiment.

Referring to FIG. 3, FIG. 3 is a schematic flowchart of a resource determining method according to an embodiment. The method includes but is not limited to the following steps.

Step S301: A terminal determines a time domain position and a resource unit type of a first time domain resource unit based on pre-stored first configuration information.

In one embodiment, the first configuration information may be predefined information, and the terminal pre-stores the predefined first configuration information. In one embodiment, a network-side device communicating with the terminal also stores the first configuration information. The first configuration information includes information used to indicate the time domain position and the resource unit type of the first time domain resource unit. The first time domain resource unit may be a transmission time unit similar to any one of a subframe, a subframe set, a timeslot, a timeslot set, a time domain symbol, a time domain symbol set, and the like in LTE, and a duration length of the first time domain resource unit is not limited herein. The time domain position of the first time domain resource unit is a position within the preset time period, and information of the preset time period, such as a start position, an end position, and duration, may be preconfigured depending on a requirement. For example, the duration is configured to one second, one minute, one hour, or the like.

At least one of the following resource unit types may be predefined: a full-downlink time domain resource unit, a full-uplink time domain resource unit, a partial-uplink time domain resource unit, a partial-downlink time domain resource unit, and a combined time domain resource unit. If a time domain resource unit is defined to be completely used to transmit downlink data, a resource unit type of the time domain resource unit is a full-downlink time domain resource unit; if a time domain resource unit is defined to be completely used to transmit uplink data, a resource unit type of the time domain resource unit is a full-uplink time domain resource unit; if a time domain resource unit is defined to be partially used to transmit uplink data, a resource unit type of the time domain resource unit is a partial-uplink time domain resource unit; if a time domain resource unit is defined to be partially used to transmit downlink data, a resource unit type of the time domain resource unit is a partial-downlink time domain resource unit; or if a time domain resource unit is defined to be partially used to transmit uplink data and partially used to transmit downlink data, a resource unit type of the time domain resource unit is a combined time domain resource unit. For example, if five types of resource units, namely, the full-uplink time domain resource unit, the full-downlink time domain resource unit, the partial-uplink time domain resource unit, the partial-downlink time domain resource unit, and the combined time domain resource unit, are predefined, the resource unit type of the first time domain resource unit is selected from the five resource unit types. For example, if four types of resource units, namely the full-uplink time domain resource unit, the full-downlink time domain resource unit, the partial-uplink time domain resource unit, and the partial-downlink time domain resource unit, are predefined, the resource unit type of the first time domain resource unit is selected from the four resource unit types.

In one embodiment, the terminal determines a time domain position and a resource unit type of a first time domain resource unit based on pre-stored first configuration information may be: The terminal determines a time domain position and a resource unit type of each of a plurality of first time domain resource units based on the pre-stored first configuration information. In other words, the first configuration information includes information used to indicate time domain positions and resource unit types of the plurality of first time domain resource units. Correspondingly, the terminal may determine the time domain position and the resource unit type of each of the plurality of first time domain resource units based on the first configuration information. The resource unit types of the first time domain resource units are selected from the four resource unit types. Therefore, the resource unit types of the first time domain resource units may be the same or different. In one embodiment, the resource unit types of the plurality of first time domain resource units are not all full-uplink time domain resource units. In other words, a resource unit type of at least one of the plurality of first time domain resource units is a full-downlink time domain resource unit or a partial-downlink time domain resource unit. In this way, the network-side device may inform the terminal of existence of the network-side device by sending a notification message on the first time domain resource unit that is a full-downlink time domain resource unit or a partial-downlink time domain resource unit.

After determining the time domain position and the resource unit type of the first time domain resource unit based on the first configuration information, the terminal may perform data transmission with the network-side device on the first time domain resource unit. The first time domain resource unit may alternatively be referred to as any one of an anchor subframe, a fixed subframe, a non-dynamic subframe, an anchor time domain resource unit, a fixed time domain resource unit, and a non-dynamic time domain resource unit. In one embodiment, the first time domain resource unit may be predefined as a time domain resource unit used to transmit UE-common data, where content included in the UE-common data may be set depending on a requirement. In one embodiment, the UE-common data includes at least one of a synchronization signal, a system message, and a measurement reference signal. In another embodiment, the first time domain resource unit may be predefined as a time domain resource used to transmit a random access request.

Step S302: The terminal determines a time domain position of a second time domain resource unit based on the time domain position of the first time domain resource unit.

In one embodiment, the terminal may first determine a remaining time domain position which is different from the time domain position of the first time domain resource unit and is within the preset time period, and may determine the remaining time domain position as the time domain position of the second time domain resource unit. In one embodiment, a time domain may be selected from remaining time domains according to a preset algorithm or rule and used as the time domain position of the second time domain resource unit.

The terminal determines a time domain position of a second time domain resource unit based on the time domain position of the first time domain resource unit may be: The terminal determines a time domain position of each of a plurality of second time domain resource units based on the time domain position of the first time domain resource unit. In other words, there may be a plurality of second time domain resource units, and the terminal may determine a time domain position of each second time domain resource unit within the preset time period.

Step S303: A network-side device sends second configuration information to the terminal. In one embodiment, the second configuration information may be carried in physical-layer control signalling.

Step S304: The terminal receives the second configuration information from the network-side device, and determines a resource unit type of the second time domain resource unit based on the second configuration information.

In one embodiment, the second configuration information includes information used to indicate the resource unit type of the second time domain resource unit. For a manner in which the second configuration information indicates the resource unit type of the second time domain resource unit, refer correspondingly to a manner in which the first configuration information indicates the resource unit type of the first time domain resource unit. For example, if four types of resource units, namely the full-uplink time domain resource unit, the full-downlink time domain resource unit, the partial-uplink time domain resource unit, and the partial-downlink time domain resource unit, are predefined, the resource unit type of the second time domain resource unit is selected from the four resource unit types.

When there may be a plurality of second time domain resource units, the second configuration information may include information used to indicate resource unit types of the plurality of second time domain resource units.

In one embodiment, before sending the second configuration information, the network-side device may first send fourth configuration information to the terminal, where the fourth configuration information indicates control channels corresponding to a part of the plurality of second time domain resource units. In this way, the terminal may receive the second configuration information on the control channels corresponding to the part of the plurality of second time domain resource units, and does not receive the second configuration information on a control channel corresponding to each second time domain resource unit.

In one embodiment, if the terminal receives second configuration information on a control channel corresponding to a second time domain resource unit, the received second configuration information indicates a resource unit type of the second time domain resource unit. For example, the plurality of second time domain resource units include a second time domain resource unit A, a second time domain resource unit B, a second time domain resource unit C, and a second time domain resource unit D. If the fourth configuration information indicates a control channel of the second time domain resource unit C and a control channel of the second time domain resource unit D, the terminal needs to receive the second configuration information only on the control channel corresponding to the second time domain resource unit C and the control channel corresponding to the second time domain resource unit D. The second configuration information received on the control channel corresponding to the second time domain resource unit C indicates a resource unit type of the second time domain resource unit C, and the second configuration information received on the control channel corresponding to the second time domain resource unit D indicates a resource unit type of the second time domain resource unit D.

In one embodiment, if the terminal receives second configuration information on a control channel corresponding to a second time domain resource unit, the received second configuration information indicates resource unit types of the plurality of second time domain resource units including the second time domain resource unit. For example, the plurality of second time domain resource units include a second time domain resource unit A, a second time domain resource unit B, a second time domain resource unit C, and a second time domain resource unit D. If the fourth configuration information indicates a control channel of the second time domain resource unit B, the terminal needs to receive the second configuration information only on the control channel corresponding to the second time domain resource unit B. The second configuration information received on the control channel corresponding to the second time domain resource unit B indicates resource unit types of the second time domain resource unit B and the second time domain resource unit C. The resource unit types of how may consecutive second time domain resource units are indicated may be predefined in the terminal, indicated by the fourth configuration information, or indicated in another way.

It should be noted that a control channel may be preconfigured for each second time domain resource unit. For example, a control channel A is configured for the second time domain resource unit A, a control channel B is configured for the second time domain resource unit B, a control channel C is configured for the second time domain resource unit C, and a control channel D is configured for the second time domain resource unit D. It may be described as that the second time domain resource unit A is corresponding to the control channel A, the second time domain resource unit B is corresponding to the control channel B, and so on. A control channel corresponding to a second time domain resource unit may be inside the second time domain resource unit, or outside the second time domain resource unit. For example, the control channel A is inside the second time domain resource unit A or outside the second time domain resource unit A, the control channel B is inside the second time domain resource unit B or outside the second time domain resource unit B, and so on.

After determining the time domain position and the resource unit type of the second time domain resource unit, the terminal may perform data transmission with the network-side device on the second time domain resource unit. In one embodiment, the second time domain resource unit may be predefined to be used to transmit data different from the UE-common data.

Figure 4:
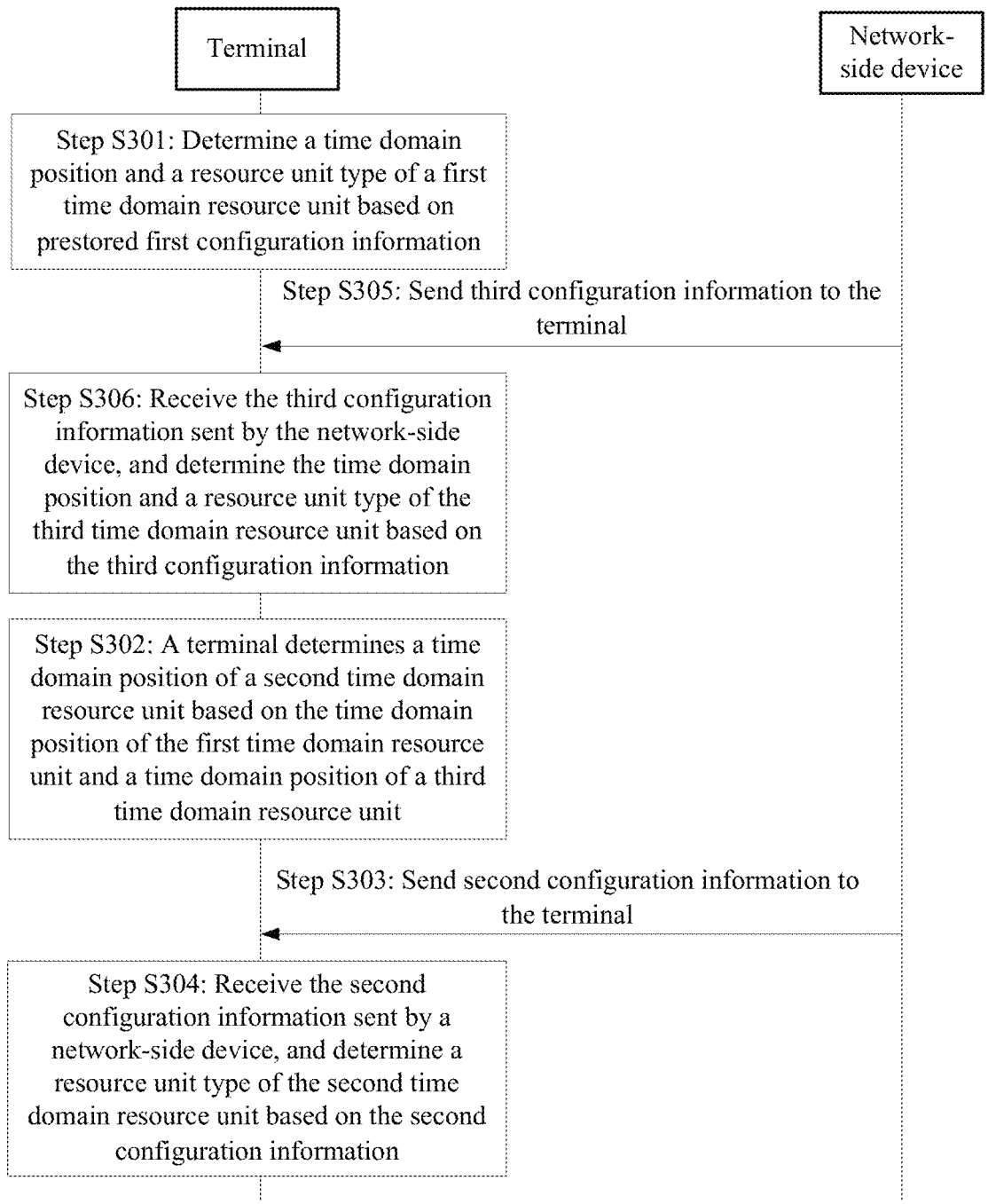
FIG. 4 is a schematic flowchart of another resource determining method according to an embodiment.

The foregoing describes how to determine the time domain position and the resource unit type of the first time domain resource unit, and how to determine the time domain position and the resource unit type of the second time domain resource unit. The following describes how to determine a time domain position and a resource unit type of a third time domain resource unit after performing step S301 and before performing step S302. Determining the time domain position and the resource unit type of the third time domain resource unit is in one embodiment. A corresponding procedure is shown in FIG. 4.

Figure 5:
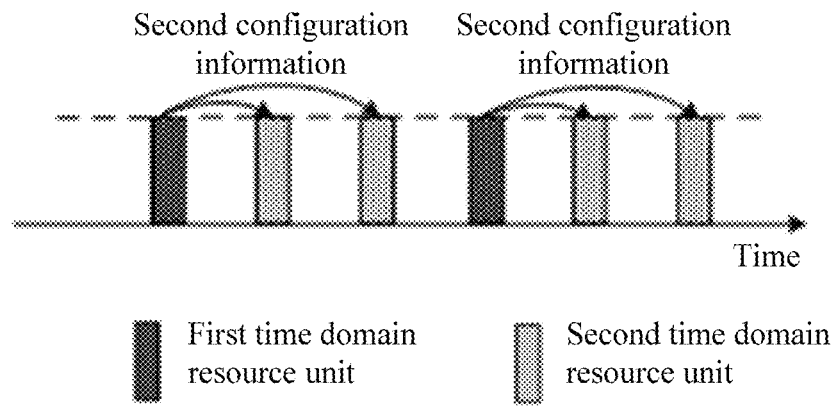
FIG. 5 is a schematic diagram of a scenario in which second configuration information is sent on a first time domain resource unit according to an embodiment.

Step S305: The network-side device sends third configuration information to the terminal. In one embodiment, the network-side device sends the third configuration information on the first time domain resource unit. As shown in FIG. 5, when there are a plurality of first time domain resource units, the network-side device may send the third configuration information on some or all of the first time domain resource units. Further, the third configuration information may be carried in a message such as a broadcast message or radio resource control (RRC) signalling.

Step S306: The terminal receives the third configuration information from the network-side device, and determines a time domain position and a resource unit type of a third time domain resource unit based on the third configuration information.

In one embodiment, the third configuration information includes information used to indicate the time domain position and the resource unit type of the third time domain resource unit. For details, refer to the first configuration information.

After determining the time domain position and the resource unit type of the third time domain resource unit based on the third configuration information, the terminal may perform data transmission with the network-side device on the third time domain resource unit. The third time domain resource unit may alternatively be referred to as any one of an anchor subframe, a fixed subframe, a non-dynamic subframe, an anchor time domain resource unit, a fixed time domain resource unit, and a non-dynamic time domain resource unit. In one embodiment, the third time domain resource unit may be predefined to be used to transmit the UE-common data. In another embodiment, the third time domain resource unit may be predefined to be used to transmit a random access request.

In one embodiment, when the first time domain resource unit is insufficient, the network-side device sends the third configuration information to the terminal, so that the terminal transmits data by using the third time domain resource unit indicated by the third configuration information. For example, the terminal needs to detect a UE-common measurement reference signal in the first time domain resource unit. A measurement reference signal is detected in low-speed and high-speed cases. In the high-speed case, a movement speed of the terminal is relatively high, a channel also changes relatively fast, and more measurement reference signals need to be measured. Therefore, in addition to the first time domain resource unit that has already been configured, more time domain resource units are needed to measure the measurement reference signals. In the low-speed case, a movement speed of the terminal is relatively low, a channel also changes relatively slowly, and no more measurement reference signals need to be measured. Therefore, the first time domain resource unit that has already been configured can meet a requirement of measuring the measurement reference signal. In the high-speed case, in addition to the first time domain resource unit that has already been configured, more time domain resource units are needed to measure the measurement reference signals. In this case, the network-side device sends the third configuration information to the terminal, so that the terminal receives and measures the measurement reference signal by using the third time domain resource unit indicated by the third configuration information.

It should be noted that after steps S305 and S306 are performed, step S302 is: The terminal determines the time domain position of the second time domain resource unit based on the time domain position of the first time domain resource unit and the time domain position of the third time domain resource unit, where the time domain position of the first time domain resource unit, the time domain position of the second time domain resource unit, and the time domain position of the third time domain resource unit are all within the preset time period, and the time domain position of the second time domain resource unit is in a remaining time domain position which is different from the time domain position of the first time domain resource unit and the time domain position of the third time domain resource unit and is within the preset time period. In other words, the terminal may first determine the remaining time domain position which is different from the time domain position of the first time domain resource unit and the time domain position of the third time domain resource unit and is within the preset time period, and the time domain position of the second time domain resource unit is in the remaining time domain position.

The foregoing describes the first configuration information, the second configuration information, and the third configuration information. Formats of the first configuration information, the second configuration information, and the third configuration information may be preconfigured. The following uses Table 1 as an example for description.

TABLE 1

|  | Full-downlink time domain resource unit | Full-uplink time domain resource unit | Partial-uplink time domain resource unit | Partial-downlink time domain resource unit | Combined time domain resource unit |
| --- | --- | --- | --- | --- | --- |
| First time domain resource unit | First configuration information of a type 1 | First configuration information of a type 2 | First configuration information of a type 3 | First configuration information of a type 4 | First configuration information of a type 5 |
| Second time domain resource unit | Second configuration information of a type 1 | Second configuration information of a type 2 | Second configuration information of a type 3 | Second configuration information of a type 4 | Second configuration information of a type 5 |
| Third time domain resource unit | Third configuration information of a type 1 | Third configuration information of a type 2 | Third configuration information of a type 3 | Third configuration information of a type 4 | Third configuration information of a type 5 |

Configuration information of each format in Table 1 can reflect that an indicated resource unit is one of the first time domain resource unit, the second time domain resource unit, and the third time domain resource unit, and can reflect that the indicated resource unit is one of the full-downlink time domain resource unit, the uplink-only time domain resource unit, the uplink-partly time domain resource unit, the partial-downlink time domain resource unit, and the combined time domain resource unit. For example, the 15 types of configuration information shown in Table 1 are all independently configured. For example, the second configuration information of the type 1, the type 2, the type 3, the type 4, and the type 5 is carried in different signalling, and the terminal may obtain, through analysis based on a type of received signalling, a type of second configuration information that is carried in the signalling, so as to obtain a corresponding resource unit type. For another example, it is preconfigured that the full-downlink time domain resource unit, the full-uplink time domain resource unit, the partial-uplink time domain resource unit, the partial-downlink time domain resource unit, and the combined time domain resource unit are respectively corresponding to type indication information 1, type indication information 2, type indication information 3, type indication information 4, and type indication information 5.

When the first configuration information includes the type indication information 1, it indicates that the resource unit type, indicated by the first configuration information, of the first time domain resource unit is a full-downlink time domain resource unit; when the first configuration information includes the type indication information 2, it indicates that the resource unit type, indicated by the first configuration information, of the first time domain resource unit is a full-uplink time domain resource unit; when the first configuration information includes the type indication information 5, it indicates that the resource unit type, indicated by the first configuration information, of the first time domain resource unit is a combined time domain resource unit; or when the first configuration information includes the type indication information 1 and the type indication information 2, the first configuration information indicates that resource unit types of a part of first time domain resource units (there are a plurality of first time domain resource units) are full-downlink time domain resource units, and indicates that resource unit types of another part of the first time domain resource units are full-uplink time domain resource units. Specific indication of configuration information may be deduced similarly.

When the second configuration information includes the type indication information 1, it indicates that the resource unit type, indicated by the second configuration information, of the second time domain resource unit is a full-downlink time domain resource unit; when the second configuration information includes the type indication information 2, it indicates that the resource unit type, indicated by the second configuration information, of the second time domain resource unit is a full-uplink time domain resource unit; when the second configuration information includes the type indication information 5, it indicates that the resource unit type, indicated by the second configuration information, of the second time domain resource unit is a combined time domain resource unit; or when the second configuration information includes the type indication information 1 and the type indication information 2, the second configuration information indicates that resource unit types of a part of second time domain resource units (there are a plurality of second time domain resource units) are full-downlink time domain resource units, and indicates that resource unit types of another part of the second time domain resource units are full-uplink time domain resource units. Specific indication of configuration information may be deduced similarly.

When the third first configuration information includes the type indication information 1, it indicates that the resource unit type, indicated by the third configuration information, of the third time domain resource unit is a full-downlink time domain resource unit; when the third configuration information includes the type indication information 2, it indicates that the resource unit type, indicated by the third configuration information, of the third time domain resource unit is a full-uplink time domain resource unit; when the third configuration information includes the type indication information 5, it indicates that the resource unit type, indicated by the third configuration information, of the third time domain resource unit is a combined time domain resource unit; or when the third configuration information includes the type indication information 1 and the type indication information 2, the third configuration information indicates that resource unit types of a part of third time domain resource units (there are a plurality of third time domain resource units) are full-downlink time domain resource units, and indicates that resource unit types of another part of the third time domain resource units are full-uplink time domain resource units. Specific indication of configuration information may be deduced similarly.

Further, the first configuration information of the type 1 includes {offset11, period11}, the first configuration information of the type 2 includes {offset12, period12}, the first configuration information of the type 3 includes {offset13, period13}, the second configuration information of the type 1 includes {offset21, period21}, the third configuration information of the type 1 includes {offset31, period31}, and so on. Parameters offset11 to offset34 indicate offsets of corresponding resource units (for example, a resource unit corresponding to offset11 is the first time domain resource unit) in time domain relative to a preset time (for example, an offset relative to a boundary of a frame with SFN=0), and parameters period11 to period34 indicate periods in which the corresponding resource units appear.

In one embodiment, the third configuration information of the type 1 to the type 5 may alternatively be indication information including three bits. If the three bits are 000, a full-downlink time domain resource unit is indicated; if the three bits are 001, a full-uplink time domain resource unit is indicated; if the three bits are 010, a partial-uplink time domain resource unit is indicated; if the three bits are 011, a partial-downlink time domain resource unit is indicated; or if the three bits are 100, a combined time domain resource unit is indicated.

In the method described in FIG. 3, the terminal determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

The method in the embodiments of the present disclosure is described in detail above. For ease of better implementing the foregoing solutions in the embodiments of the present disclosure, an apparatus in an embodiment of the present disclosure is correspondingly provided below.

Figure 6:
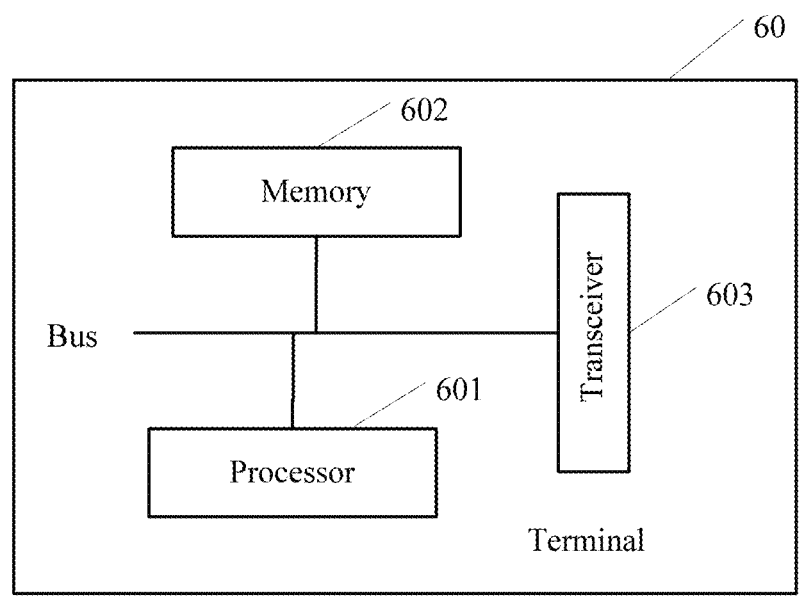
FIG. 6 is a schematic structural diagram of a terminal according to an embodiment.

Referring to FIG. 6, FIG. 6 shows a terminal 60 according to an embodiment. The terminal 60 includes a processor 601 (there may be one or more processors 601, and one processor is used as an example in FIG. 6), a memory 602, and a transceiver 603 (may include a radio frequency module, an antenna, and the like). In some embodiments, the processor 601, the memory 602, and the transceiver 603 may be connected by using a bus or in another manner. A connection by using a bus is used as an example in FIG. 6.

A time domain position and a resource unit type of a first time domain resource unit are determined based on pre-stored first configuration information, where the first configuration information includes information used to indicate the time domain position and the resource unit type of the first time domain resource unit.

A time domain position of a second time domain resource unit is determined based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period.

Second configuration information from a network-side device is received by using the transceiver 603, and a resource unit type of the second time domain resource unit is determined based on the second configuration information, where the second configuration information includes information used to indicate the resource unit type of the second time domain resource unit.

By performing the foregoing operations, the terminal 60 determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

In one embodiment, after determining the time domain position and the resource unit type of the first time domain resource unit based on the pre-stored first configuration information, the processor 601 is further configured to:

receive, by using the transceiver 603, third configuration information from the network-side device, and determine a time domain position and a resource unit type of a third time domain resource unit based on the third configuration information, where the third configuration information includes information used to indicate the time domain position and the resource unit type of the third time domain resource unit.

The processor 601 determines a time domain position of a second time domain resource unit based on the time domain position of the first time domain resource unit by:

determining the time domain position of the second time domain resource unit based on the time domain position of the first time domain resource unit and the time domain position of the third time domain resource unit, where the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

In another embodiment, that the processor 601 receives, by using the transceiver 603, third configuration information from the network-side device by:

receiving, by using the transceiver 603, the third configuration information from the network-side device on the first time domain resource unit.

In another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In another embodiment, the first configuration information includes type indication information used to indicate the resource unit type of the first time domain resource unit, and each resource unit type is corresponding to type indication information of the resource unit type.

In another embodiment, the second configuration information includes the type indication information used to indicate the resource unit type of the second time domain resource unit, and each resource unit type is corresponding to type indication information of the resource unit type.

In another embodiment, when the third configuration information exists, the third configuration information includes the type indication information used to indicate the resource unit type of the third time domain resource unit, and each resource unit type is corresponding to type indication information of the resource unit type.

In another embodiment, the processor 601 determines a time domain position and a resource unit type of a first time domain resource unit based on pre-stored first configuration information by:

determining a time domain position and a resource unit type of each of a plurality of first time domain resource units based on the pre-stored first configuration information.

In another embodiment, the processor 601 determines a time domain position of a second time domain resource unit based on the time domain position of the first time domain resource unit by:

determining a time domain position of each of a plurality of second time domain resource units based on the time domain position of the first time domain resource unit.

In another embodiment, before receiving, by using the transceiver 603, the second configuration information from the network-side device, the processor 601 is further configured to:

receive, by using the transceiver 603, fourth configuration information from the network-side device, where the fourth configuration information indicates control channels corresponding to a part of the plurality of second time domain resource units.

The processor 601 receives, by using the transceiver 603, second configuration information from a network-side device by:

receiving, by using the transceiver 603, the second configuration information on the control channels corresponding to the part of the plurality of second time domain resource units, where the second configuration information is used to indicate resource unit types of the part of the plurality of second time domain resource units.

It should be noted that for an implementation of the terminal 60 in this embodiment, refer to corresponding descriptions of the method embodiment shown in FIG. 3.

The terminal 60 described in FIG. 6 determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

Figure 7:
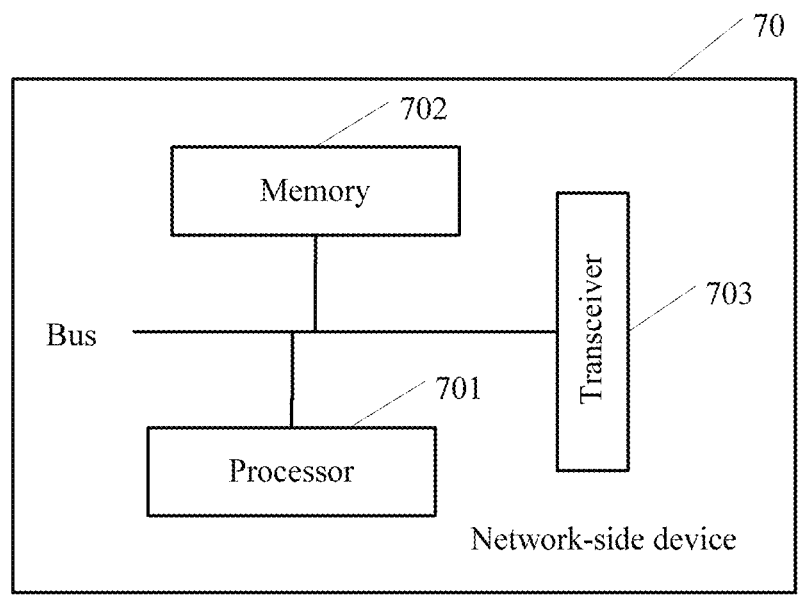
FIG. 7 is a schematic structural diagram of a network-side device according to an embodiment.

Referring to FIG. 7, FIG. 7 shows a network-side device 70 according to an embodiment. The network-side device 70 includes a processor 701 (there may be one or more processors 701, and one processor is used as an example in FIG. 7), a memory 702, and a transceiver 703 (may include a radio frequency module, an antenna, and the like). In some embodiments, the processor 701, the memory 702, and the transceiver 703 may be connected by using a bus or in another manner. A connection by using a bus is used as an example in FIG. 7.

Second configuration information is sent to a terminal by using the transceiver 703, where the terminal is configured to perform operations of determining a time domain position and a resource unit type of a first time domain resource unit based on pre-stored first configuration information, determining a time domain position of a second time domain resource unit based on the time domain position of the first time domain resource unit, and determining a resource unit type of the second time domain resource unit based on the second configuration information; both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; the first configuration information includes information used to indicate the time domain position and the resource unit type of the first time domain resource unit; and the second configuration information includes information used to indicate the resource unit type of the second time domain resource unit.

By performing the foregoing operations, the terminal determines the time domain position and the resource unit type of the first time domain resource unit based on the pre-stored first configuration information, and further determines the time domain position and the resource unit type of the second time domain resource unit based on the second configuration information sent by the network-side device 70, without depending on a TDD configuration to determine a time domain position and a resource unit type of a resource unit.

In one embodiment, before sending the second configuration information to the terminal by using the transceiver 703, the processor 701 is further configured to:

send third configuration information to the terminal by using the transceiver 703, where the terminal is configured to determine a time domain position and a resource unit type of a third time domain resource unit based on the third configuration information, and the third configuration information includes information used to indicate the time domain position and the resource unit type of the third time domain resource unit; the time domain position of the first time domain resource unit, the time domain position of the second time domain resource unit, and the time domain position of the third time domain resource unit are all within the preset time period; and the time domain position of the second time domain resource unit is at a time domain position which is different from the time domain position of the first time domain resource unit and the time domain position of the third time domain resource unit and is within the preset time period.

In another embodiment, the processor 701 sends third configuration information to the terminal, by using the transceiver 703, by:

sending the third configuration information to the terminal on the first time domain resource unit by using the transceiver 703.

In another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In another embodiment, the first configuration information includes type indication information used to indicate the resource unit type of the first time domain resource unit, and each resource unit type is corresponding to type indication information of the resource unit type.

In another embodiment, the second configuration information includes the type indication information used to indicate the resource unit type of the second time domain resource unit, and each resource unit type is corresponding to type indication information of the resource unit type.

In another embodiment, when the third configuration information exists, the third configuration information includes the type indication information used to indicate the resource unit type of the third time domain resource unit, and each resource unit type is corresponding to type indication information of the resource unit type.

In another embodiment, before sending the second configuration information to the terminal by using the transceiver 703, the processor 701 is further configured to:

send fourth configuration information to the terminal by using the transceiver 703, where the fourth configuration information is used to instruct the terminal to receive the second configuration information on a control channel corresponding to the second time domain resource unit.

It should be noted that for an implementation of the network-side device 70 in this embodiment, refer to corresponding descriptions of the method embodiment shown in FIG. 3.

In the network-side device 70 described in FIG. 7, the terminal determines the time domain position and the resource unit type of the first time domain resource unit based on the pre-stored first configuration information, and further determines the time domain position and the resource unit type of the second time domain resource unit based on the second configuration information sent by the network-side device 70, without depending on a TDD configuration to determine a time domain position and a resource unit type of a resource unit.

Figure 8:
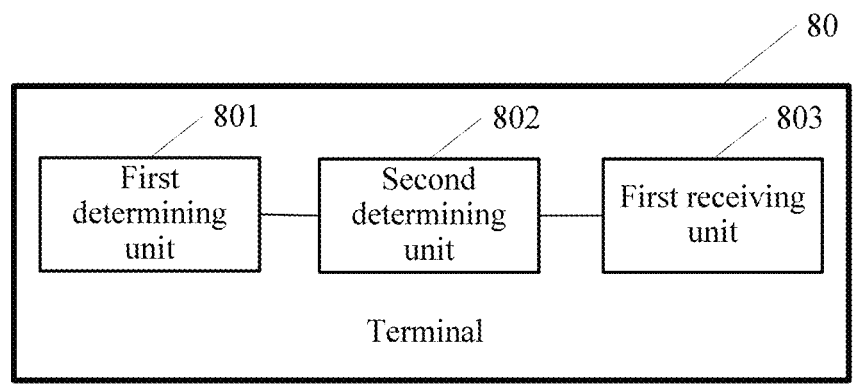
FIG. 8 is a schematic structural diagram of another terminal according to an embodiment.

Referring to FIG. 8, FIG. 8 is a schematic structural diagram of a terminal 80 according to an embodiment. The terminal 80 includes a first determining unit 801, a second determining unit 802, and a first receiving unit 803. The units are described in detail as follows.

The first determining unit 801 is configured to determine a time domain position and a resource unit type of a first time domain resource unit based on pre-stored first configuration information, where the first configuration information includes information used to indicate the time domain position and the resource unit type of the first time domain resource unit.

The second determining unit 802 is configured to determine a time domain position of a second time domain resource unit based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period.

The first receiving unit 803 is configured to receive second configuration information from a network-side device, and determine a resource unit type of the second time domain resource unit based on the second configuration information, where the second configuration information includes information used to indicate the resource unit type of the second time domain resource unit.

By running the foregoing units, the terminal 80 determines the time domain position and the resource unit type of the first time domain resource unit based on the prestored first configuration information, and further determines the time domain position and the resource unit type of the second time domain resource unit based on the second configuration information sent by the network-side device, without depending on a TDD configuration to determine a time domain position and a resource unit type of a resource unit.

In one embodiment, the terminal 80 further includes a second receiving unit.

The second receiving unit is configured to: after the first determining unit 801 determines the time domain position and the resource unit type of the first time domain resource unit based on the pre-stored first configuration information, receive third configuration information from the network-side device, and determine a time domain position and a resource unit type of a third time domain resource unit based on the third configuration information, where the third configuration information includes information used to indicate the time domain position and the resource unit type of the third time domain resource unit.

The second determining unit 802 is configured to determine the time domain position of the second time domain resource unit based on the time domain position of the first time domain resource unit and the time domain position of the third time domain resource unit, where the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

By running the foregoing units, the terminal 80 determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

In another embodiment, the second receiving unit is configured to receive the third configuration information from the network-side device on the first time domain resource unit.

In another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In another embodiment, the first configuration information includes type indication information used to indicate the resource unit type of the first time domain resource unit, and each resource unit type is corresponding to type indication information of the resource unit type.

In another embodiment, the second configuration information includes the type indication information used to indicate the resource unit type of the second time domain resource unit, and each resource unit type is corresponding to type indication information of the resource unit type.

In another embodiment, when the third configuration information exists, the third configuration information includes the type indication information used to indicate the resource unit type of the third time domain resource unit, and each resource unit type is corresponding to type indication information of the resource unit type.

In another embodiment, the first determining unit 801 is configured to determine a time domain position and a resource unit type of each of a plurality of first time domain resource units based on the prestored first configuration information.

In another embodiment, the second determining unit 802 is configured to determine a time domain position of each of a plurality of second time domain resource units based on the time domain position of the first time domain resource unit.

In another embodiment, the terminal 80 further includes a third receiving unit.

The third receiving unit is configured to: before the second receiving unit receives the second configuration information from the network-side device, receive fourth configuration information from the network-side device, where the fourth configuration information indicates control channels corresponding to a part of the plurality of second time domain resource units.

The second receiving unit is configured to receive the second configuration information on the control channels corresponding to the part of the plurality of second time domain resource units, where the second configuration information is used to indicate resource unit types of the part of the plurality of second time domain resource units.

It should be noted that for an implementation of the terminal 80 in this embodiment of the present invention, refer to corresponding descriptions of the method embodiment shown in FIG. 3.

The terminal 80 described in FIG. 8 determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

Figure 9:
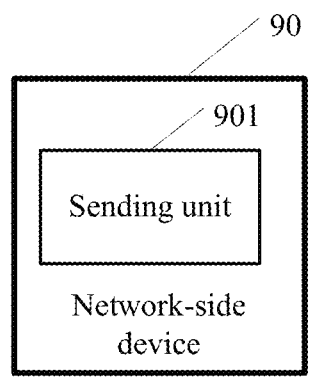
FIG. 9 is a schematic structural diagram of another network-side device according to an embodiment.

Referring to FIG. 9, FIG. 9 is a schematic structural diagram of a network-side device 90 according to an embodiment. The network-side device 90 includes a sending unit 901, and the sending unit 901 is described in detail as follows.

The sending unit 901 is configured to send second configuration information to a terminal, where the terminal is configured to perform operations of determining a time domain position and a resource unit type of a first time domain resource unit based on pre-stored first configuration information, determining a time domain position of a second time domain resource unit based on the time domain position of the first time domain resource unit, and determining a resource unit type of the second time domain resource unit based on the second configuration information; both the time domain position of the first time domain resource unit and the time domain position of the second time domain resource unit are within the preset time period, and the time domain position of the second time domain resource unit is at a time domain position which is different from the time domain position of the first time domain resource unit and is within the preset time period; the first configuration information includes information used to indicate the time domain position and the resource unit type of the first time domain resource unit; and the second configuration information includes information used to indicate the resource unit type of the second time domain resource unit.

By running the network-side device 90, the terminal determines the time domain position and the resource unit type of the first time domain resource unit based on the prestored first configuration information, and further determines the time domain position and the resource unit type of the second time domain resource unit based on the second configuration information sent by the network-side device 90, without depending on a TDD configuration to determine a time domain position and a resource unit type of a resource unit.

In one embodiment, before sending the second configuration information to the terminal, the sending unit 901 is further configured to send third configuration information to the terminal, where the terminal is configured to determine a time domain position and a resource unit type of a third time domain resource unit based on the third configuration information, and the third configuration information includes information used to indicate the time domain position and the resource unit type of the third time domain resource unit; the time domain position of the first time domain resource unit, the time domain position of the second time domain resource unit, and the time domain position of the third time domain resource unit are all within the preset time period; and the time domain position of the second time domain resource unit is at a time domain position which is different from the time domain position of the first time domain resource unit and the time domain position of the third time domain resource unit and is within the preset time period.

In another embodiment, the sending unit 901 sends third configuration information to the terminal by: sending the third configuration information to the terminal on the first time domain resource unit.

In another embodiment, the resource unit type includes at least one of the following resource unit types: a full-uplink time domain resource unit, a full-downlink time domain resource unit, a partial-uplink time domain resource unit, a partial-downlink time domain resource unit, and a combined time domain resource unit.

In another embodiment, the first configuration information includes type indication information used to indicate the resource unit type of the first time domain resource unit, and each resource unit type is corresponding to type indication information of the resource unit type.

In another embodiment, the second configuration information includes the type indication information used to indicate the resource unit type of the second time domain resource unit, and each resource unit type is corresponding to type indication information of the resource unit type.

In another embodiment, when the third configuration information exists, the third configuration information includes the type indication information used to indicate the resource unit type of the third time domain resource unit, and each resource unit type is corresponding to type indication information of the resource unit type.

In another embodiment, before sending the second configuration information to the terminal, the sending unit 901 is further configured to send fourth configuration information to the terminal, where the fourth configuration information is used to instruct the terminal to receive the second configuration information on a control channel corresponding to the second time domain resource unit.

It should be noted that for an implementation of the network-side device 90 in this embodiment, refer to corresponding descriptions of the method embodiment shown in FIG. 3.

In the terminal communicating with the network-side device described in FIG. 9, the terminal determines the time domain position and the resource unit type of the first time domain resource unit based on the pre-stored first configuration information, and further determines the time domain position and the resource unit type of the second time domain resource unit based on the second configuration information sent by the network-side device 90, without depending on a TDD configuration to determine a time domain position and a resource unit type of a resource unit.

Figure 10:
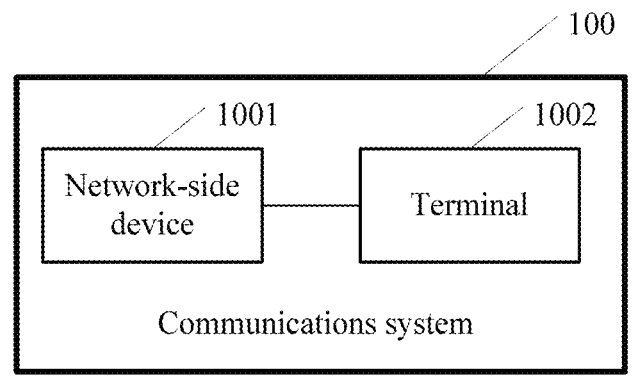
FIG. 10 is a schematic structural diagram of a communications system according to an embodiment.

Referring to FIG. 10, FIG. 10 is a schematic structural diagram of a communications system 100 according to an embodiment. The communications system 100 includes a network-side device 1001 and a terminal 1002, where the terminal 1002 is configured to determine a time domain position and a resource unit type of a first time domain resource unit based on pre-stored first configuration information, where the first configuration information includes information used to indicate the time domain position and the resource unit type of the first time domain resource unit;

the terminal 1002 is further configured to determine a time domain position of a second time domain resource unit based on the time domain position of the first time domain resource unit, where both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period;

the network-side device 1001 is configured to send second configuration information to the terminal 1002; and the terminal 1002 is further configured to receive the second configuration information from the network-side device 1001, and determine a resource unit type of the second time domain resource unit based on the second configuration information, where the second configuration information includes information used to indicate the resource unit type of the second time domain resource unit.

In one embodiment, the terminal 1002 is the terminal 60 shown in FIG. 6 or the terminal 80 shown in FIG. 8, and the network-side device 1001 is the network-side device 70 shown in FIG. 7 or the network-side device 90 shown in FIG. 9.

In conclusion, by implementing the embodiments of the present disclosure, the terminal determines the time domain position and the resource unit type of the first time domain resource unit based on the pre-stored first configuration information, and further determines the time domain position and the resource unit type of the second time domain resource unit based on the second configuration information sent by the network-side device, without depending on a TDD configuration to determine a time domain position and a resource unit type of a resource unit.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium includes: any medium that can store program code, such as a read-only memory (ROM), a random access memory (RAM), a magnetic disk, or an optical disc.

What is claimed is:

1. A method for determining a resource, comprising:
    determining a time domain position and a resource unit type of a first time domain resource unit based on first configuration information, wherein the first configuration information comprises information used to indicate the time domain position and the resource unit type of the first time domain resource unit;
    determining a time domain position of a second time domain resource unit based on the time domain position of the first time domain resource unit, wherein both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; and
    receiving second configuration information from a network-side device, and determining a resource unit type of the second time domain resource unit based on the second configuration information, wherein the second configuration information comprises information used to indicate the resource unit type of the second time domain resource unit.

2. The method according to claim 1, wherein after determining the time domain position and the resource unit type of the first time domain resource unit,
    receiving third configuration information from the network-side device, and determining a time domain position and a resource unit type of a third time domain resource unit based on the third configuration information, wherein the third configuration information comprises information used to indicate the time domain position and the resource unit type of the third time domain resource unit; and
    wherein determining the time domain position of the second time domain resource unit comprises:
    determining the time domain position of the second time domain resource unit based on the time domain position of the first time domain resource unit and the time domain position of the third time domain resource unit, wherein the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

3. The method according to claim 2, wherein receiving the third configuration information from the network-side device comprises:
    receiving the third configuration information from the network-side device on the first time domain resource unit.

4. The method according to claim 1, wherein the resource unit types of the first and second time domain resource units comprise at least one of the following resource unit types: a full-uplink time domain resource unit, a full-downlink time domain resource unit, a partial-uplink time domain resource unit, a partial-downlink time domain resource unit, or a combined time domain resource unit.

5. The method according to claim 4, wherein the first configuration information comprises type indication information used to indicate the resource unit type of the first time domain resource unit, and each of the resource unit types of the first and second time domain resource units corresponds to type indication information of the resource unit type.

6. The method according to claim 4, wherein the second configuration information comprises type indication information used to indicate the resource unit type of the second time domain resource unit, and each of the resource unit types of the first and second time domain resource units corresponds to type indication information of the resource unit type.

7. The method according to claim 4, wherein when the third configuration information exists, the third configuration information comprises the type indication information used to indicate the resource unit type of the third time domain resource unit, and each of the resource unit types of the first and second time domain resource units corresponds to type indication information of the resource unit type.

8. The method according to claim 1, wherein determining the time domain position and the resource unit type of the first time domain resource unit comprises:
    determining a time domain position and a resource unit type of each of a plurality of first time domain resource units based on the first configuration information.

9. The method according to claim 1, wherein determining the time domain position of the second time domain resource unit comprises:
    determining a time domain position of each of a plurality of second time domain resource units based on the time domain position of the first time domain resource unit.

10. The method according to claim 9, wherein before receiving the second configuration information from the network-side device,
    receiving fourth configuration information from the network-side device, wherein the fourth configuration information indicates control channels corresponding to a part of the plurality of second time domain resource units; and
    wherein receiving the second configuration information from the network-side device comprises:
    receiving the second configuration information on the control channels corresponding to the part of the plurality of second time domain resource units, wherein the second configuration information is used to indicate resource unit types of the part of the plurality of second time domain resource units.

11. A communication apparatus comprising a processor and a memory, the memory configured to store a program, and to invoke the program in the memory to execute operations, the operations comprising:

determining a time domain position and a resource unit type of a first time domain resource unit based on first configuration information, wherein the first configuration information comprises information used to indicate the time domain position and the resource unit type of the first time domain resource unit;

determining a time domain position of a second time domain resource unit based on the time domain position of the first time domain resource unit, wherein both the time domain position of the first time domain resource unit and the time domain position of the second time domain resource unit are within a preset time period, and the time domain position of the second time domain resource unit is at a time domain position which is different from the time domain position of the first time domain resource unit and is within the preset time period; and receiving second configuration information from a network-side device, and determining a resource unit type of the second time domain resource unit based on the second configuration information, wherein the second configuration information comprises information used to indicate the resource unit type of the second time domain resource unit.

12. The apparatus according to claim 11, wherein after determining the time domain position and the resource unit type of the first time domain resource unit, receiving third configuration information from the network-side device, and determining a time domain position and a resource unit type of a third time domain resource unit based on the third configuration information, wherein the third configuration information comprises information used to indicate the time domain position and the resource unit type of the third time domain resource unit; and wherein determining the time domain position of the second time domain resource unit comprises:

determining the time domain position of the second time domain resource unit based on the time domain position of the first time domain resource unit and the time domain position of the third time domain resource unit, wherein the time domain position of the first time domain resource unit, the time domain position of the second time domain resource unit, and the time domain position of the third time domain resource unit are all within the preset time period, and the time domain position of the second time domain resource unit is at a time domain position which is different from the time domain position of the first time domain resource unit and the time domain position of the third time domain resource unit and is within the preset time period.

13. The apparatus according to claim 12, wherein receiving the third configuration information from the network-side device comprises:

receiving the third configuration information from the network-side device on the first time domain resource unit.

14. The apparatus according to claim 11, wherein the resource unit types of the first and second time domain resource units comprise at least one of the following resource unit types: a full-uplink time domain resource unit, a full-downlink time domain resource unit, a partial-uplink time domain resource unit, a partial-downlink time domain resource unit, or a combined time domain resource unit.

15. The apparatus according to claim 14, wherein the first configuration information comprises type indication information used to indicate the resource unit type of the first time domain resource unit, and each of the resource unit types of the first and second time domain resource units corresponds to type indication information of the resource unit type.

16. The apparatus according to claim 14, wherein the second configuration information comprises type indication information used to indicate the resource unit type of the second time domain resource unit, and each of the resource unit types of the first and second time domain resource units corresponds to type indication information of the resource unit type.

17. The apparatus according to claim 14, wherein when the third configuration information exists, the third configuration information comprises the type indication information used to indicate the resource unit type of the third time domain resource unit, and each of the resource unit types of the first and second time domain resource units corresponds to type indication information of the resource unit type.

18. The apparatus according to claim 11, wherein determining the time domain position and the resource unit type of the first time domain resource unit comprises:

determining a time domain position and a resource unit type of each of a plurality of first time domain resource units based on the first configuration information.

19. The apparatus according to claim 11, wherein determining the time domain position of the second time domain resource unit comprises:

determining a time domain position of each of a plurality of second time domain resource units based on the time domain position of the first time domain resource unit.

20. The apparatus according to claim 19, wherein before receiving the second configuration information from the network-side device, receiving fourth configuration information from the network-side device, wherein the fourth configuration information indicates control channels corresponding to a part of the plurality of second time domain resource units; and wherein receiving the second configuration information from the network-side device comprises:

receiving the second configuration information on the control channels corresponding to the part of the plurality of second time domain resource units, wherein the second configuration information is used to indicate resource unit types of the part of the plurality of second time domain resource units.

* * * * *